(12) United States Patent
Nakagaki et al.

(10) Patent No.: US 9,016,795 B2
(45) Date of Patent: Apr. 28, 2015

(54) VEHICLE SEAT

(75) Inventors: Yoshihisa Nakagaki, Yokohama (JP);
Tomio Matsufuji, Yokohama (JP);
Nozomu Munemura, Yokohama (JP);
Atsuo Matsumoto, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 241 days.

(21) Appl. No.: 13/497,790

(22) PCT Filed: Sep. 7, 2010

(86) PCT No.: PCT/JP2010/065347
§ 371 (c)(1),
(2), (4) Date: Mar. 22, 2012

(87) PCT Pub. No.: WO2011/052297
PCT Pub. Date: May 5, 2011

(65) Prior Publication Data
US 2012/0267936 A1  Oct. 25, 2012

(30) Foreign Application Priority Data
Oct. 27, 2009  (JP) .................................. 2009-246455

(51) Int. Cl.
*A47C 7/02* (2006.01)
*B60R 22/26* (2006.01)
(Continued)

(52) U.S. Cl.
CPC .............. *B60R 22/26* (2013.01); *B60N 2/2245* (2013.01); *B60N 2/36* (2013.01); *B60N 2/366* (2013.01); *B60N 2/68* (2013.01); *B60N 2/686* (2013.01); *B60R 2022/1818* (2013.01)

(58) Field of Classification Search
CPC ........... A47C 3/12; B60N 2/682; B60N 2/366
USPC ................ 297/452.14, 452.2, 378.13, 452.18
See application file for complete search history.

(56) References Cited

U.S. PATENT DOCUMENTS 5,058,949 A * 10/1991 Von Hoffman .................. 297/45
5,476,305 A * 12/1995 Corkins et al. ................ 297/238
(Continued)

FOREIGN PATENT DOCUMENTS

DE          10022984 A1   11/2001
EP           1413475 A2    4/2004
(Continued)

OTHER PUBLICATIONS

Office Action issued Jan. 19, 2015 in corresponding European application No. 10826432.6.

*Primary Examiner* — David R Dunn
*Assistant Examiner* — Alexander Harrison
(74) *Attorney, Agent, or Firm* — Knobbe Martens Olson & Bear LLP

(57) ABSTRACT

A vehicle seat that may assure stiffness of a seatback and that may realize a reduction in weight. In the present rear seat for a vehicle, a substantially X-shaped X-rib (24) is joined to a panel frame (22) of a rear seatback. A first reinforcement portion (24A) of the X-rib (24) spans in a linear shape between an anchor wire (68), which is a point of action of a load, and a first supported portion (22A) of the panel frame (22), which is supported at a vehicle body via a turning hinge (48). A second reinforcement portion (24B), which has a length direction middle portion in common with the first reinforcement portion (24A), spans in a linear shape between a second supported portion (22B) of the panel frame (22), which is supported at the vehicle body via a turning hinge (56), and a third supported portion (22C) of the panel frame (22), which is supported at the vehicle body via a lock mechanism (64).

17 Claims, 8 Drawing Sheets

(51) Int. Cl.
  *B60N 2/22* (2006.01)
  *B60N 2/36* (2006.01)
  *B60N 2/68* (2006.01)
  *B60R 22/18* (2006.01)

(56) References Cited

U.S. PATENT DOCUMENTS

| | | | | |
|---|---|---|---|---|
| 5,487,591 A | * | 1/1996 | Knoblock | 297/452.14 |
| 5,611,598 A | * | 3/1997 | Knoblock | 297/452.14 |
| 6,688,700 B2 | * | 2/2004 | Gupta et al. | 297/452.18 |
| 6,739,673 B2 | * | 5/2004 | Gupta et al. | 297/452.65 |
| 6,997,515 B2 | * | 2/2006 | Gupta et al. | 297/452.18 |
| 7,452,020 B2 | * | 11/2008 | Warsi et al. | 296/65.17 |
| 2006/0103228 A1 | * | 5/2006 | Gupta et al. | 297/452.65 |

FOREIGN PATENT DOCUMENTS

| | | |
|---|---|---|
| JP | 63-2224 U | 2/1988 |
| JP | 63-22244 | 2/1988 |
| JP | 7-303541 A | 11/1995 |
| JP | 7-314171 A | 12/1995 |
| JP | 9-254689 A | 9/1997 |
| JP | 2005-199919 A | 7/2005 |

* cited by examiner

FIG. 5
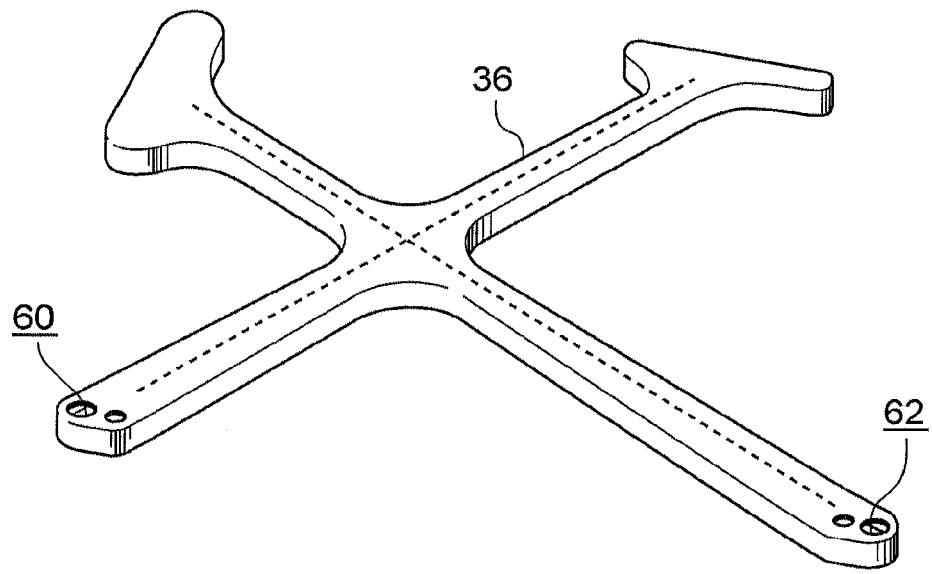
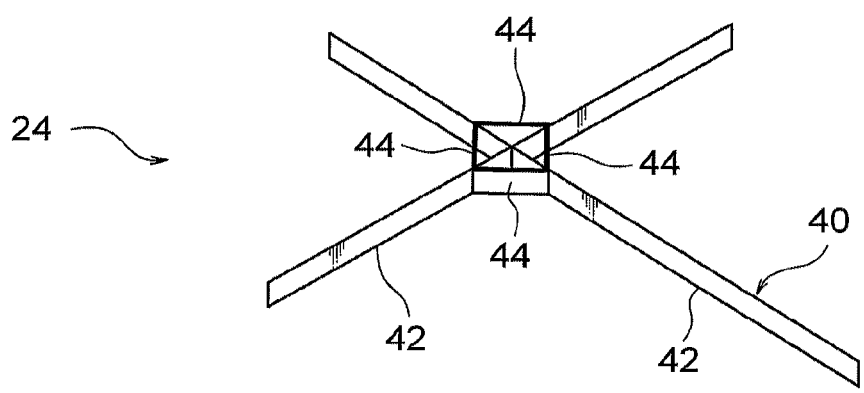
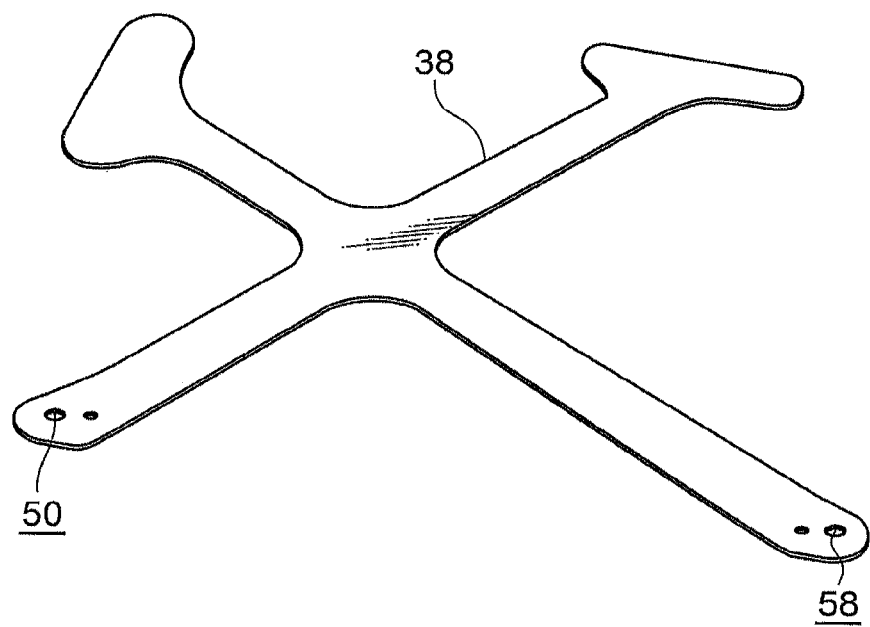

FIG. 8
| | REAR SEATBACK FRAME 100 | REAR SEATBACK FRAME 18 |
|---|---|---|
| STRENGTH | 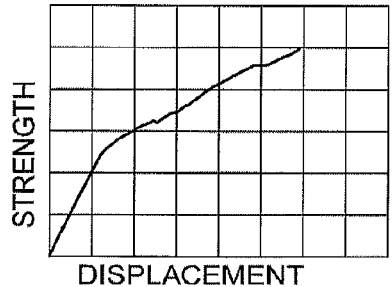 | 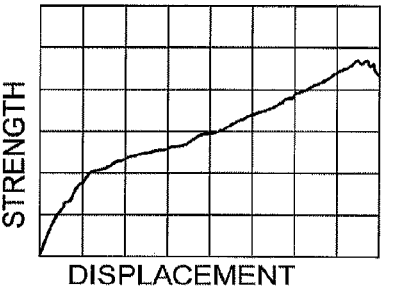 |
| WEIGHT RATIO | REFERENCE (100%) | 69% (A 31% REDUCTION) |

VEHICLE SEAT

CROSS-REFERENCE TO RELATED APPLICATIONS

This application is the U.S. National Phase under 35. U.S.C. §371 of International Application PCT/JP2010/065347, filed Sep. 7, 2010, which claims priority to Japanese Patent Application No. 2009-246455, filed Oct. 27, 2009. The International Application was published under PCT Article 21(2) in a language other than English.

TECHNICAL FIELD

The present invention relates to a vehicle seat that is provided with a seatback, both width direction end sides at a lower side and one width direction end side at an upper side of the seatback is supported by a vehicle body.

BACKGROUND ART

A seatback frame disclosed in Japanese Patent Application Laid-Open (JP-A) No. H7-303541 is a press-formed item of a single plate, and is provided with an outer periphery flange portion and a plural number of drawn flange portions formed by drawing machining. Each drawn flanged portion is disposed so as to linearly link a point of support of the seatback at a vehicle body side and a point of action of a forward load on the seatback. Thus, stiffness of the seatback frame is effectively improved.

DISCLOSURE OF INVENTION

Technical Subject

However, as mentioned above, the seatback frame formed as described above is a press-formed item of a single plate. Therefore, if a plate thickness dimension of the flange portions is increased in order to assure strength of the drawn flange portions and the outer periphery flange portion (that is, portions formed by drawing), the plate thickness dimension of flat portions that do not particularly require strength is also increased. As a result, the seatback frame is heavier and the weight of the vehicle seat increases.

In consideration of the circumstances described above, a subject of the present invention is to provide a seat for a vehicle in which stiffness of a seatback may be assured and a reduction in weight may be realized.

Solution to Subject

A vehicle seat relating to a first aspect of the invention is provided with a panel frame that is formed in a panel shape and constitutes a framework of a seatback and a reinforcement member. A first supported portion, a second supported portion and a third supported portion of the panel frame are supported at a vehicle body, the first supported portion being provided at one width direction end side of a lower portion side of the panel frame, the second supported portion being provided at the other width direction end side of the lower portion side, and the third supported portion being provided at one width direction end side of an upper portion side of the panel frame. The reinforcement member is formed in a closed cross-section shape and includes an open cross-section member with an open cross-section shape and a flat plate member with a flat plate shape, which is joined to an open side of the open cross-section member. A peripheral edge portion of the flat plate member protrudes to an outer side of a peripheral edge portion of the open cross-section member in a flange shape and the protruding portion is welded to an open side end portion of the open cross-section member. The reinforcement member includes a first reinforcement portion and a second reinforcement portion and is joined to the panel frame, the first reinforcement portion spanning between the first supported portion and a portion of the upper portion side of the panel frame at the width direction other end side relative to the third supported portion, and the second reinforcement portion being provided to intersect the first reinforcement portion and spanning between the second supported portion and the third supported portion.

The term "of the upper end portion side of the panel frame at the width direction other end side relative to the third supported portion" recited in the first aspect refers to a region that includes a width direction central portion vicinity and the width direction other end side of the upper portion side of the panel frame.

In the vehicle seat according to the first aspect, when a load in the front-rear direction of the seatback is borne at the width direction other end side relative to the third supported portion of the upper end portion side of the panel frame, that is, at the side that is not supported at the vehicle body, deformation of the panel frame is suppressed by the bending stiffness of the first reinforcement portion and the second reinforcement portion of the reinforcement member. Thus, stiffness of the seatback may be assured. In addition, because the stiffness of the seatback is assured by the reinforcement member that is joined to the panel frame, there is no need to increase a plate thickness dimension of the panel frame. Therefore, the panel frame may be reduced in weight, and consequently the overall structure of the present vehicle seat may be reduced in weight. Moreover, because the reinforcement member is formed in a closed cross-section shape in this vehicle seat, even if a plate thickness dimension of the reinforcement member is reduced and the reinforcement member is reduced in weight, stiffness of the reinforcement member may be assured. Therefore, the overall structure of the present vehicle seat may be further reduced in weight. Further still, the reinforcement member with the closed cross-section shape is formed by the flat plate member with the flat plate shape being joined to the open side of the open cross-section member with the open cross-section shape. Therefore, the reinforcement member with the closed cross-section shape may be fabricated easily.

A vehicle seat according to a second aspect of the invention is the vehicle seat according to the first aspect, in which each of the first reinforcement portion and the second reinforcement portion is formed to be linear.

In the vehicle seat according to the second aspect, the supported portions of the panel frame with the vehicle body and the side of the panel frame that is not supported with the vehicle body are linearly connected by the first reinforcement portion and the second reinforcement portion. Therefore, it may be that only necessary regions are effectively reinforced. Thus, unnecessary material is saved and a reduction in weight of the reinforcement member may be realized. The term "linearly" recited in the second aspect is to encompass shapes that appear linear overall, even if provided with some amount of irregularity, slightly curved or the like.

A vehicle seat according to a third aspect of the invention is the vehicle seat according to the first aspect or the second aspect, in which a seatbelt support portion that supports a seatbelt applied to a seat occupant is provided at the width direction other end side of the upper portion side of the panel frame relative to the third supported portion.

In the vehicle seat according to the third aspect, when the load of a seat occupant acting to move to forward side of the seatback, due to inertia during a rapid deceleration of the vehicle or the like, is inputted to the seatbelt support portion at the panel frame upper portion side via the seatbelt, this load is supported by the bending stiffness of the first reinforcement portion and second reinforcement portion of the reinforcement member. Thus, stiffness of the seatback with respect to a load from the seatbelt may be excellently assured.

A vehicle seat according to a fourth aspect of the invention is the vehicle seat according to the third aspect, in which the seatbelt support portion is provided at the first reinforcement portion.

In the vehicle seat according to the fourth aspect, the load from the seatbelt is inputted to the seatbelt support portion provided at the first reinforcement portion of the reinforcement member. Therefore, the load from the seatbelt may be directly supported by the reinforcement member. Thus, stiffness of the seatback with respect to a load from the seatbelt may be even more excellently assured.

A vehicle seat according to a seventh aspect of the invention is the vehicle seat according to any one of the first to fourth aspects, in which the reinforcement member further includes a reinforcement plate that spans between a floor wall portion of the open cross-section member and the flat plate member and that is joined to both of the open cross-section member and the flat plate member.

In the vehicle seat according to the seventh aspect, the stiffness of the reinforcement member is improved by the reinforcement plate that is joined to both the floor wall portion of the open cross section member and the flat plate member and spans therebetween. Therefore, stiffness of the reinforcement member may be assured even if the plate thickness dimensions of the open cross-section member and the flat plate member are reduced. Thus, the reinforcement member may be even further reduced in weight.

A vehicle seat according to an eighth aspect of the invention is the vehicle seat according to any one of the first to fourth and seventh aspects, in which the reinforcement member is provided with the first reinforcement portion and the second reinforcement portion integrally.

A vehicle seat according to a ninth aspect of the invention is the vehicle seat according to the fourth aspect, in which a seatbelt support portion setting portion is provided at the first reinforcement portion, the seatbelt support portion setting portion being formed in a long strip shape along the width direction of the panel frame, and the seatbelt support portion is mounted at a seatbelt support portion setting portion.

A vehicle seat according to a tenth aspect of the invention is the vehicle seat according to the ninth aspect, in which the seatbelt support portion setting portion is formed to be longer than the seatbelt support portion.

A vehicle seat according to an eleventh aspect of the invention is the vehicle seat according to any one of the first to fourth and seventh to tenth aspects, in which a lock setting portion is provided at the second reinforcement portion, the lock setting portion being formed in a long strip shape along an up-down direction of the panel frame, and a lock mechanism is mounted at the lock setting portion, the lock mechanism catching on a striker that is mounted at a vehicle body side portion.

A vehicle seat according to a twelfth aspect of the invention is the vehicle seat according to the eleventh aspect, in which the lock setting portion is formed to be longer than the lock mechanism.

A vehicle seat according to a thirteenth aspect of the invention is the vehicle seat according to any one of the first to fourth and seventh to twelfth aspects, in which hinge arms are fastened to the first reinforcement portion and the second reinforcement portion, the hinge arms being hinge-joined to hinge bases that are fixed to the vehicle body.

A vehicle seat according to a fourteenth aspect of the invention is the vehicle seat according to the third aspect or the fourth aspect, in which a belt retractor that winds up the seatbelt is mounted at the panel frame, and the seatbelt support portion is provided at the upper side of the panel frame relative to the belt retractor.

A vehicle seat according to a fifteenth aspect of the invention is the vehicle seat according to the seventh aspect, in which the reinforcement plate is formed by two long plates being combined into an X shape, the first reinforcement portion being reinforced by one of the long plates, and the second reinforcement portion being reinforced by the other of the long plates.

A vehicle seat according to a sixteenth aspect of the invention is the vehicle seat according to the seventh aspect, in which pluralities of the reinforcement plate are provided in rows with predetermined spacings in the length directions of the first reinforcement portion and the second reinforcement portion. A vehicle seat according to a seventeenth aspect of the invention is the vehicle seat according to any one of the first to fourth and seventh to sixteenth aspects, in which the open cross-section member and the flat plate member are formed in X shapes.

Advantageous Effects of Invention

As described hereabove, the vehicle seat relating to the first aspect of the invention may assure stiffness of the seatback and may realize a reduction in weight.

The vehicle seat relating to the second aspect of the invention may save unnecessary material and realize a reduction in weight of the reinforcement member.

The vehicle seat relating to the third aspect of the invention may excellently assure stiffness of the seatback with respect to a load from a seatbelt.

The vehicle seat relating to the fourth aspect of the invention may even more excellently assure stiffness of the seatback with respect to a load from a seatbelt.

The vehicle seat relating to the seventh aspect of the invention enables a further reduction in weight of the reinforcement member.

BRIEF DESCRIPTION OF THE DRAWINGS

FIG. 5 is an exploded perspective diagram of the X-rib illustrated in FIG. 4;

FIG. 8 is a chart illustrating results of strength tests on the rear seatback frame relating to the present exemplary embodiment and the related art rear seatback frame, and a weight ratio between the two.

BEST MODE FOR CARRYING OUT THE INVENTION

Figure 1:
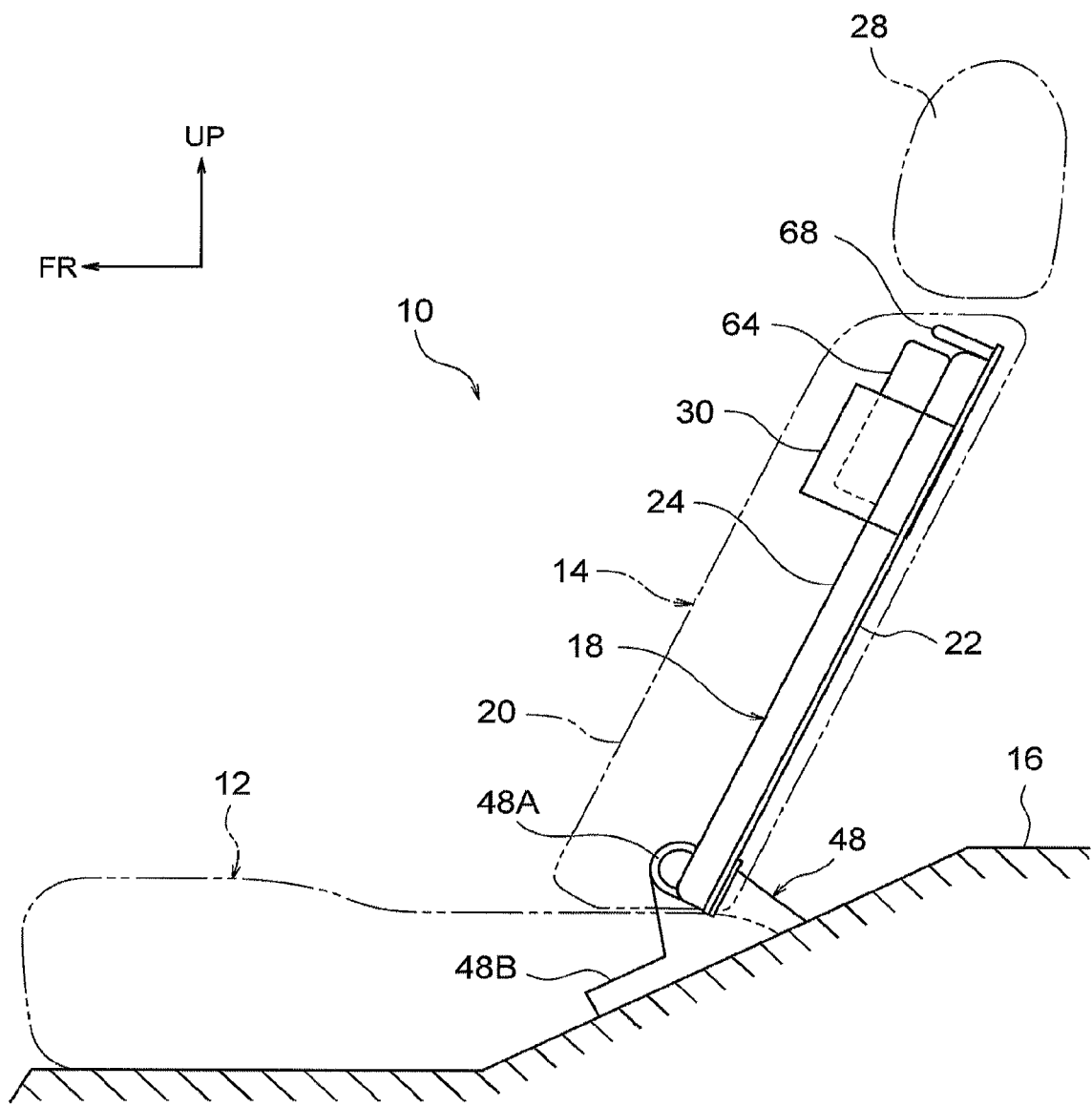
FIG. 1 is a schematic side elevation diagram illustrating the structure of principal portions of a vehicle rear seat relating to an exemplary embodiment of the present invention.

Herebelow, a vehicle rear seat 10 that serves as a vehicle seat relating to an exemplary embodiment of the present invention is described with reference to FIG. 1 to FIG. 8. An arrow FR that is shown in the drawings represents a forward side of a vehicle in which the vehicle rear seat 10 is mounted, an arrow UP represents an upward side of the vehicle, an arrow LH represents a leftward side of the vehicle, and an arrow RH represents a rightward side of the vehicle.

Figure 2:
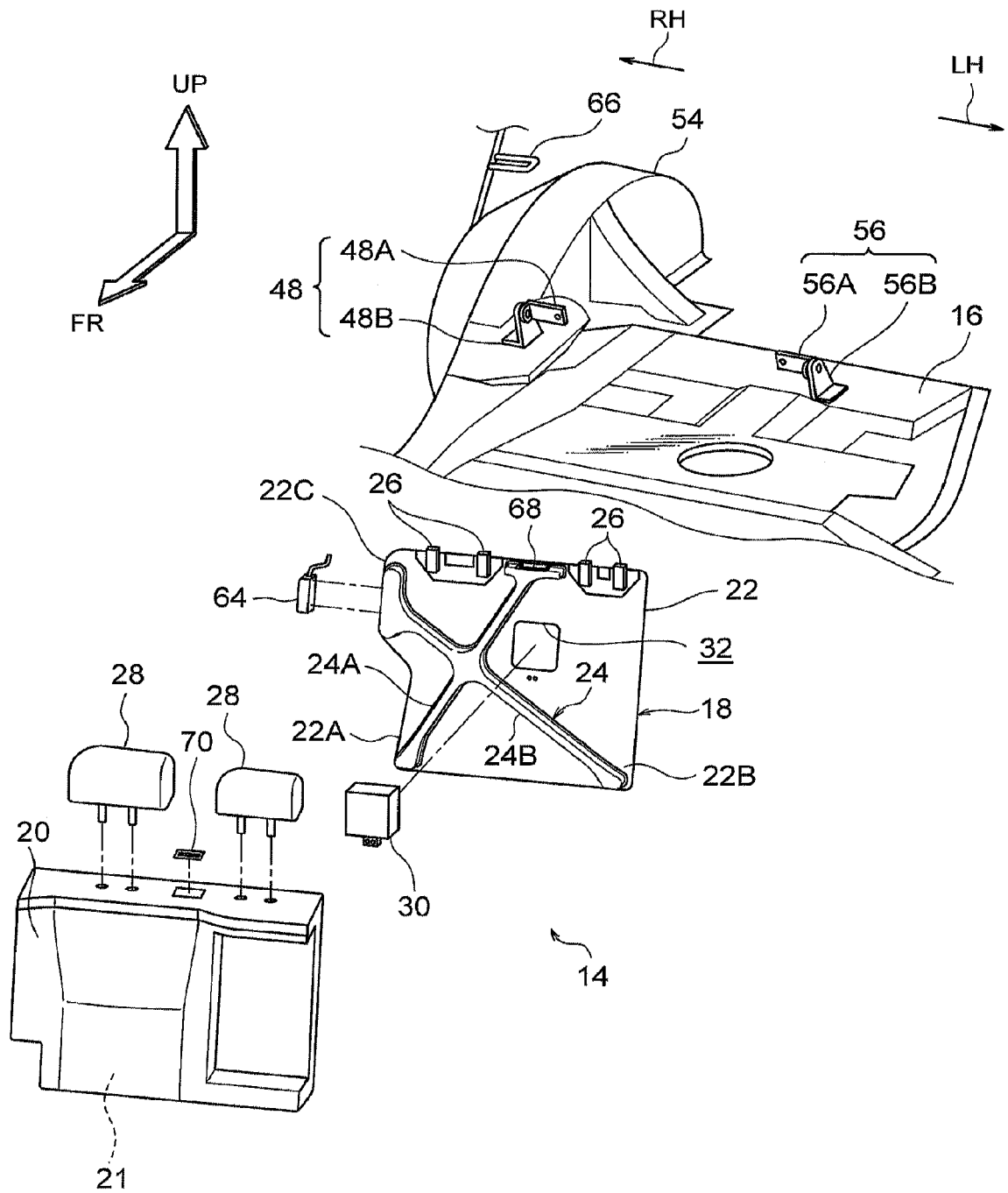
FIG. 2 is an exploded perspective diagram of a rear seatback that is a structural member of the vehicle rear seat relating to the exemplary embodiment of the present invention.

As illustrated in FIG. 1, the vehicle rear seat 10 relating to the present exemplary embodiment is provided with a rear seat cushion 12, which supports the buttock area and thigh area of a seat occupant, and a rear seatback 14, which supports the back area of the seat occupant. The rear seat cushion 12 is mounted to a top face of a rear floor pan 16 of the vehicle body. The rear seatback 14 constitutes one side of a foldable rear seatback that is divided between left and right for what is referred to in Japan as a "trunk-through", and serves as a rear seatback for two people. In FIG. 2, an unillustrated rear seatback for one person is disposed at the vehicle body left side of the rear seatback 14.

The rear seatback 14 is provided with a rear seatback frame 18 that serves as a framework member. A rear seatback pad 21 that is covered by a seat cover 20 is mounted at the forward side of the rear seatback frame 18.

The rear seatback frame 18 is provided with a panel frame 22 that is formed in a panel shape, and an X-rib 24, which serves as a reinforcement member that reinforces the panel frame 22. The panel frame 22 is disposed at a rear portion side of the rear seatback 14 in a state in which a plate thickness direction of the panel frame 22 is along the front-rear direction of the rear seatback 14. The panel frame 22 constitutes a framework of the rear seatback 14.

A plural number (four in this case) of headrest support brackets 26 (not illustrated in FIG. 1) are mounted in a row in the width direction (the left-right direction of the vehicle body in this case) at an upper end portion of the panel frame 22. Unillustrated headrest supports for supporting a pair of left and right headrests 28 illustrated in FIG. 2 are mounted at the headrest support brackets 26. A rectangular aperture 32 for mounting of a belt retractor 30 (a webbing winding device) is formed in the vicinity of a central portion of the panel frame 22. The belt retractor 30 winds up a seatbelt 34 for occupant restraint (a webbing; see FIG. 3) from one length direction end side of the seatbelt 34, and is fastened at a peripheral edge portion of the aperture 32 by nuts and bolts.

Figure 3:
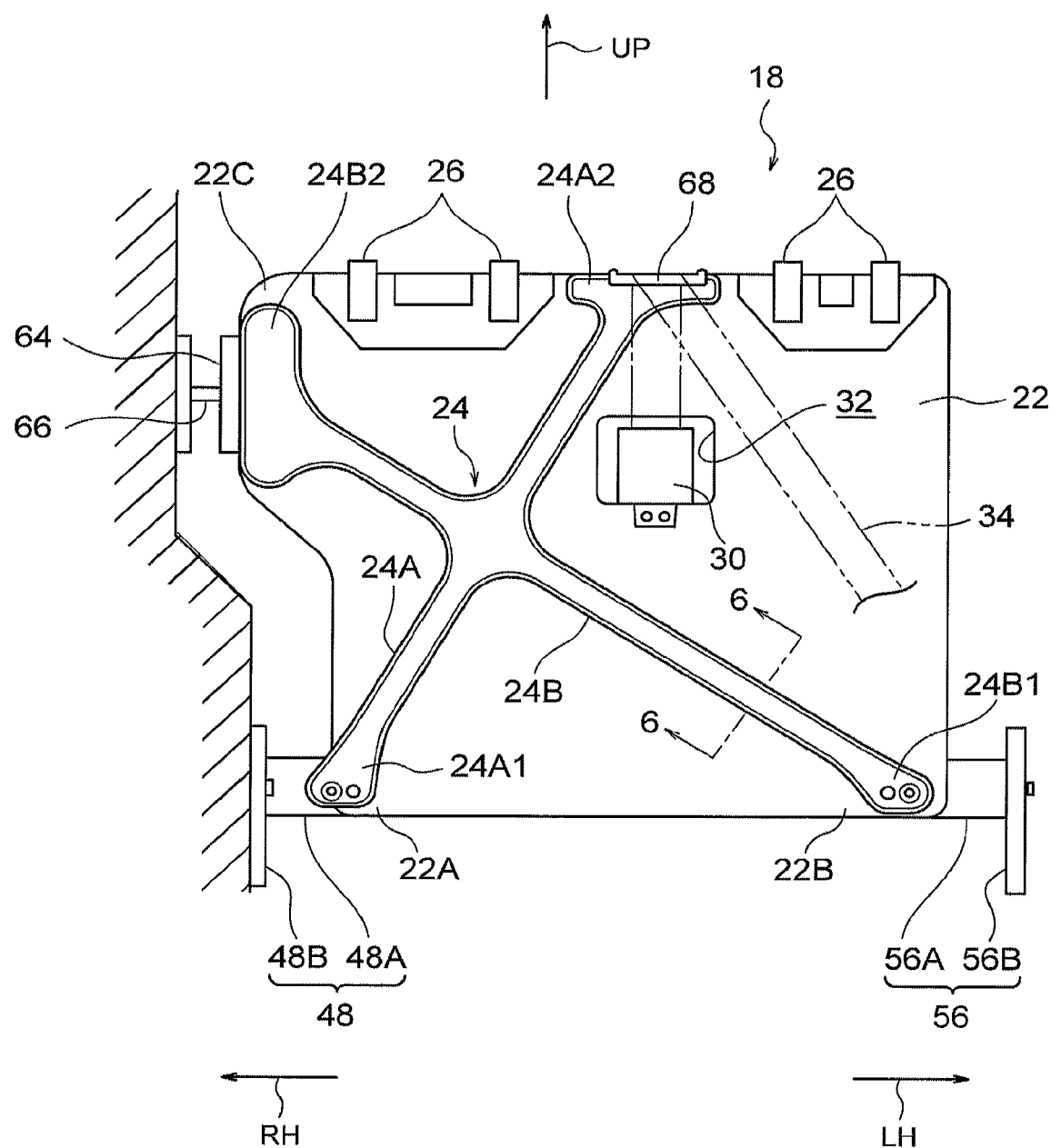
FIG. 3 is a front elevation diagram of a rear seatback frame that is a structural member of the rear seatback illustrated in FIG. 2.
Figure 4:
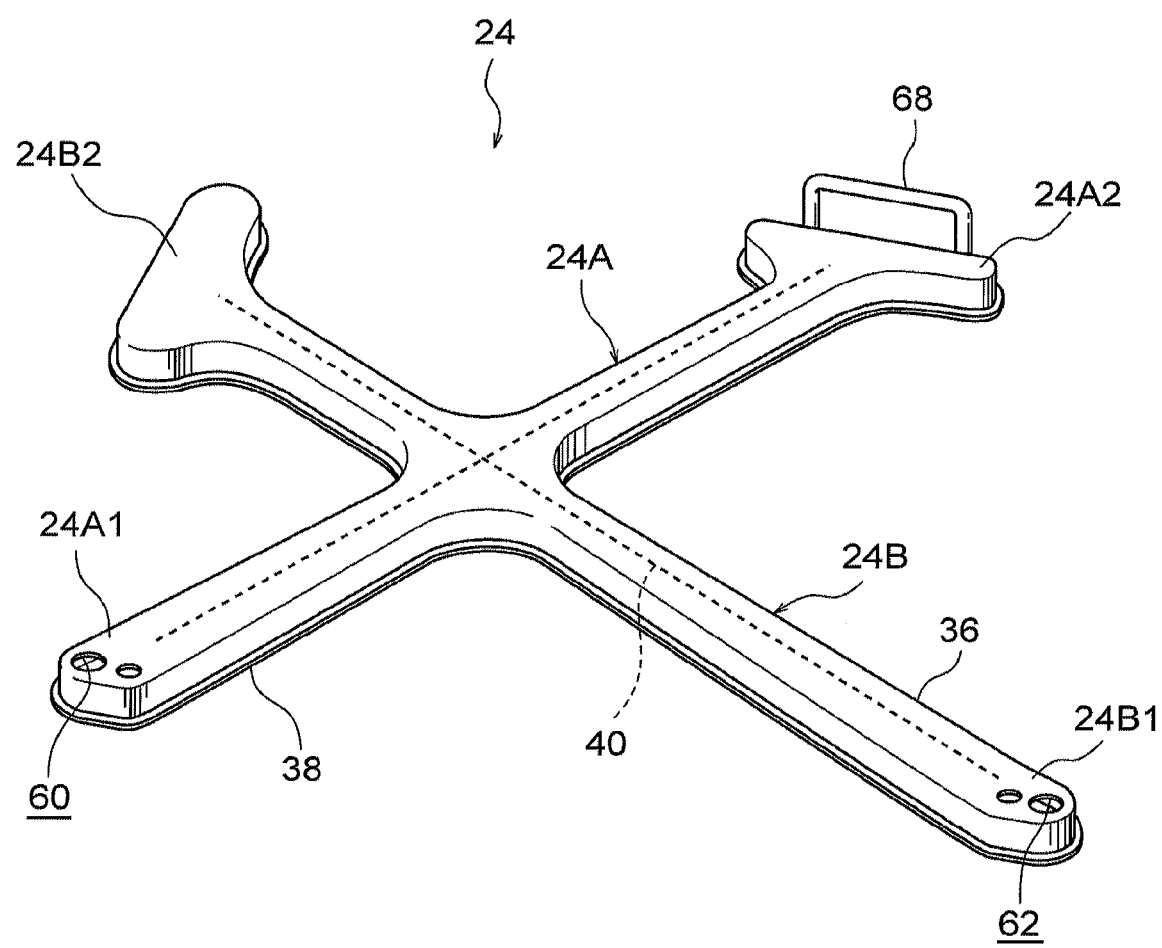
FIG. 4 is a perspective diagram of an X-rib that is a structural member of the rear seatback frame illustrated in FIG. 3.

The X-rib 24 is disposed at the forward side of the panel frame 22. As illustrated in FIG. 3 and FIG. 4, the X-rib 24 is integrally provided with a first reinforcement portion 24A and a second reinforcement portion 24B, which are formed in long, linear shapes. The first reinforcement portion 24A and second reinforcement portion 24B intersect with one another, having a portion in common at respective length direction middle portions thereof. Thus, the X-rib 24 is formed in a substantial "X" shape as viewed from the front-rear direction of the rear seatback 14.

Figure 6:
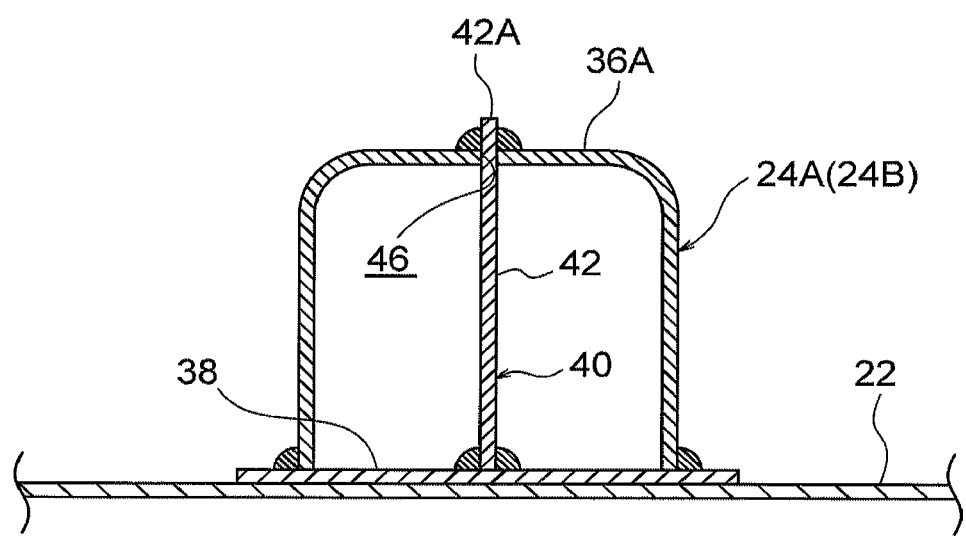
FIG. 6 is a sectional diagram illustrating a cross-section cut along line 6-6 of FIG. 3.

The X-rib 24 is constituted by an open cross-section member 36, a flat plate member 38 and a reinforcement plate 40, which are illustrated in FIG. 5. Each of these members is formed in a substantial X shape. The open cross-section member 36 is a press-formed component formed by drawing machining of a metal plate material. As illustrated in FIG. 6, the open cross-section member 36 is formed in a shape with an open cross section, of which the panel frame 22 side is open.

The flat plate member 38 is a press-formed component formed in a flat plate shape of a metal plate material. The flat plate member 38 is disposed between the open cross-section member 36 and the panel frame 22 in a state of closing off the opening of the open cross-section member 36. Peripheral edge portions of the flat plate member 38 protrude in the form of a flange to the outer side of peripheral edge portions of the open cross-section member 36, and the protruding portions are welded to open side end portions of the open cross-section member 36. Thus, the X-rib 24 is formed into a closed cross-section shape, as illustrated in FIG. 6.

The reinforcement plate 40 is formed of two long plates 42, which are formed in long strip shapes of a metal plate material, being combined into an X shape. The region at which these long plates 42 intersect is reinforced by four short plates 44 that are formed in the shape of rectangular cards. One length direction end portion of each short plate 44 is welded to one of the long plates 42, and the other length direction end portion is welded to the other long plate 42. Thus, the short plates 44 are disposed to be aligned in a rectangular shape so as to surround the intersection region.

The long plates 42 described above are disposed at the inner side of the open cross-section member 36 with a width direction of each long plate 42 (a short dimension direction) along the plate thickness direction of the flat plate member 38. One width direction end portion of each long plate 42 is welded to the flat plate member 38. The other width direction end portion of each long plate 42 is provided with a plural number of welding pieces 42A in a row along the length direction of the long plate 42 in a comb shape. These welding pieces 42A are respectively inserted into plural slits 46 formed in a floor wall portion 36A of the open cross-section member 36 (a wall portion that opposes the flat plate member 38), which are formed to correspond with the welding pieces 42A. The inserted welding pieces 42A are respectively welded to the floor wall portion 36A. Thus, each long plate 42 of the reinforcement plate 40 spans between the flat plate member 38 and the floor wall portion 36A of the open cross-section member 36, the first reinforcement portion 24A is reinforced by one of the long plates 42, and the second reinforcement portion 24B is reinforced by the other of the long plates 42.

When the X-rib 24 is being fabricated, the reinforcement plate 40 is welded to the flat plate member 38, then the open cross-section member 36 is placed on the flat plate member 38 and welded, and finally the reinforcement plate 40 and the floor wall portion 36A are welded.

The X-rib 24 is integrally joined to the panel frame 22, by the flat plate member 38 being welded to the panel frame 22. One width direction end portion (a vehicle body right side end portion) of a lower end portion of the panel frame 22 serves as a first supported portion 22A, which is supported at the vehicle body. A hinge fastening portion 24A1, which is provided at one width direction end portion (a lower end portion) of the first reinforcement portion 24A, is joined to the first supported portion 22A, and a hinge arm 48A of a turning hinge 48 is also fastened at the first supported portion 22A.

The hinge arm 48A is fastened to the panel frame 22 and the hinge fastening portion 24A1 by a bolt being screwed into an unillustrated weld nut. The bolt penetrates through an unillustrated penetration hole formed in the panel frame 22 and a penetration hole 50 (see FIG. 5) formed in the flat plate member 38. The weld nut is welded to the flat plate member 38 in advance and disposed inside the closed cross section of the first reinforcement portion 24A.

The hinge arm 48A is hinge-joined to a hinge base 48B, which is fixed to a rear wheel housing 54 of the vehicle body. Thus, the hinge arm 48A is made relatively turnable with respect to the hinge base 48B about an axis along the vehicle width direction. Thus, the first supported portion 22A of the panel frame 22 is supported to be turnable at the vehicle body side.

The other length direction end portion of the first reinforcement portion 24A (an upper end portion) is joined to a vicinity of a width direction central portion of the upper end portion of the panel frame 22 (the upper side of the panel frame 22 relative to the above-mentioned belt retractor 30).

The width direction other end portion (a vehicle body left side end portion) of the lower end portion of the panel frame 22 serves as a second supported portion 22B, which is supported at the vehicle body. A hinge fastening portion 24B1, which is provided at one width direction end portion (a lower end portion) of the second reinforcement portion 24B, is joined to the second supported portion 22B, and a hinge arm 56A of a turning hinge 56 is also fastened at the second supported portion 22B.

The hinge arm 56A is fastened to the panel frame 22 and the hinge fastening portion 24B1 by a bolt being screwed into an unillustrated weld nut. The bolt penetrates through an unillustrated penetration hole formed in the panel frame 22 and a penetration hole 58 (see FIG. 5) formed in the flat plate member 38. The weld nut is welded to the flat plate member 38 in advance and disposed inside the closed cross section of the second reinforcement portion 24B. Penetration holes 60 and 62 are formed in the open cross-section member 36 for insertion of tools during operations of fastening the hinge arms 48A and 56A and suchlike. In another embodiment, the hinge arm 48A may be fastened to the hinge fastening portion 24A1 directly, with a portion of the first supported portion 22A of the panel frame 22 being omitted, and the hinge arm 56A may be fastened to the hinge fastening portion 24B1 directly, with a portion of the second supported portion 22B of the panel frame 22 being omitted.

The hinge arm 56A is hinge-joined to a hinge base 56B, which is fixed to the rear floor pan 16 of the vehicle body. Thus, the hinge arm 56A is made relatively turnable with respect to the hinge base 56B about an axis running along the vehicle width direction. Thus, the second supported portion 22B of the panel frame 22 is supported to be turnable at the vehicle body side, and the rear seatback 14 is made relatively turnable with respect to the vehicle body about the turning hinges 48 and 56. The rear seatback 14 is relatively turnable between an upright position relative to the vehicle body (the position illustrated in FIG. 1) and a forward-tilted position that is tilted to the vehicle body forward side of the turning hinges 48 and 56.

One width direction end portion (a vehicle right side portion) of an upper portion side of the panel frame 22 serves as a third supported portion 22C, which is supported at the vehicle body. The other length direction end portion (upper end portion) of the second reinforcement portion 24B is joined to the third supported portion 22C. As illustrated in FIG. 3, a lock setting portion 24B2 is provided at the other length direction end portion of the second reinforcement portion 24B. The lock setting portion 24B2 is formed in a long strip shape along the up-down direction of the panel frame 22. A locking mechanism 64 is fastened to the lock setting portion 24B2 by a nut and bolt. The lock setting portion 24B2 is formed to be longer than the locking mechanism 64.

The locking mechanism 64 described above is provided with an unillustrated latch. When the rear seatback 14 is being turned to the upright position, the latch catches on a striker 66 that is mounted at a vehicle body side portion. Hence, the rear seatback 14 is restrained in the upright position, and the third supported portion 22C of the panel frame 22 is supported at the vehicle body via the locking mechanism 64 and the striker 66.

That is, the rear seatback 14 has a structure that is supported at the vehicle body at three points, the first supported portion 22A, the second supported portion 22B and the third supported portion 22C. In this rear seatback 14, the first reinforcement portion 24A of the X-rib 24 linearly spans between the first supported portion 22A and a vicinity of a width direction central portion of the upper end portion of the panel frame 22 (the width direction other end side of the rear seatback 14 relative to the third supported portion 22C), and the second reinforcement portion 24B linearly spans between the second supported portion 22B and the third supported portion 22C.

An anchor wire setting portion 24A2 is provided at the other length direction end portion (upper end portion) of the first reinforcement portion 24A that is joined to the width direction central portion vicinity of the upper end portion of the panel frame 22. The anchor wire setting portion 24A2 is formed in a long strip shape along the width direction of the panel frame 22. An anchor wire 68 that serves as a seatbelt support portion (see FIG. 4) is mounted at the anchor wire setting portion 24A2.

The anchor wire 68 is formed by machining to bend a rod made of metal into a U shape. The two end portions of the anchor wire 68 at the open side thereof are firmly fixed to the anchor wire setting portion 24A2. The anchor wire setting portion 24A2 is formed to be longer than the anchor wire 68.

A length direction middle portion of the seatbelt 34, which is unwound from the belt retractor 30, is wound through the anchor wire 68. The seatbelt 34 is passed through an aperture of a bezel 70 attached at an upper portion of the rear seatback 14 and pulled out to the outer side of the rear seatback 14. A length direction other end portion of the seatbelt 34 (an end portion at the opposite side thereof from the side that is anchored at the belt retractor 30) is anchored at an unillustrated anchor plate that is fixed to the rear floor pan 16. When a seat occupant puts on the seatbelt, an unillustrated tongue plate that is provided between the anchor plate and the anchor wire 68 is fastened to an unillustrated buckle device that is fixed to the rear floor pan 16. Hence, the body of the seat occupant is restrained by the seatbelt 34.

Now, operation and effects of the present exemplary embodiment are described.

In the vehicle rear seat 10 with the structure described above, when, for example, the vehicle rapidly decelerates, the belt retractor 30 locks and unwinding of the seatbelt 34 is blocked. At the same time, a load of the seat occupant acting to move to the vehicle body forward side due to inertia acts on the upper end portion of the first reinforcement portion 24A of the X-rib 24, via the seatbelt 34 and the anchor wire 68.

The first reinforcement portion 24A of the X-rib 24 linearly spans between the anchor wire 68, which is the point of action of the load, and the first supported portion 22A of the panel frame 22, which is supported at the vehicle body via the turning hinge 48. The second reinforcement portion 24B, which has a length direction middle portion in common with the first reinforcement portion 24A, linearly spans between the second supported portion 22B of the panel frame 22, which is supported at the vehicle body via the turning hinge 56, and the third supported portion 22C of the panel frame 22, which is supported at the vehicle body via the locking mechanism 64.

Therefore, when a load toward the vehicle body forward side is borne at the upper end portion of the first reinforcement portion 24A as described above, rather than a torsional load, a bending load acts on the first reinforcement portion 24A and the second reinforcement portion 24B. Therefore, the load acting on the upper end portion of the first reinforcement portion 24A is firmly supported by the bending stiffness of the first reinforcement portion 24A and the second reinforcement portion 24B. Thus, deformation of the panel frame 22 to which the X-rib 24 is joined is effectively suppressed, and stiffness of the rear seatback 14 with respect to the load from the seatbelt 34 may be excellently assured.

In addition, the X-rib 24 directly and linearly links between the portions of the panel frame 22 that are supported at the vehicle body as mentioned above (restraint points) and the point of action of the load. Thus, only necessary portions are effectively reinforced. Therefore, unnecessary material may be saved and a reduction in weight of the X-rib 24 may be realized, and because the stiffness of the panel frame 22 is assured by the X-rib 24, there is no need to increase a plate thickness dimension of the panel frame 22. Therefore, the panel frame 22 may be reduced in weight and, consequently, the overall structure of the present vehicle rear seat 10 may be reduced in weight. This may reduce a usage amount of iron ore, meaning fossil material. It may also contribute to a reduction in weight of the vehicle, which may contribute to a reduction in fuel consumption of the vehicle and hence a reduction in carbon dioxide emissions.

Figure 7:
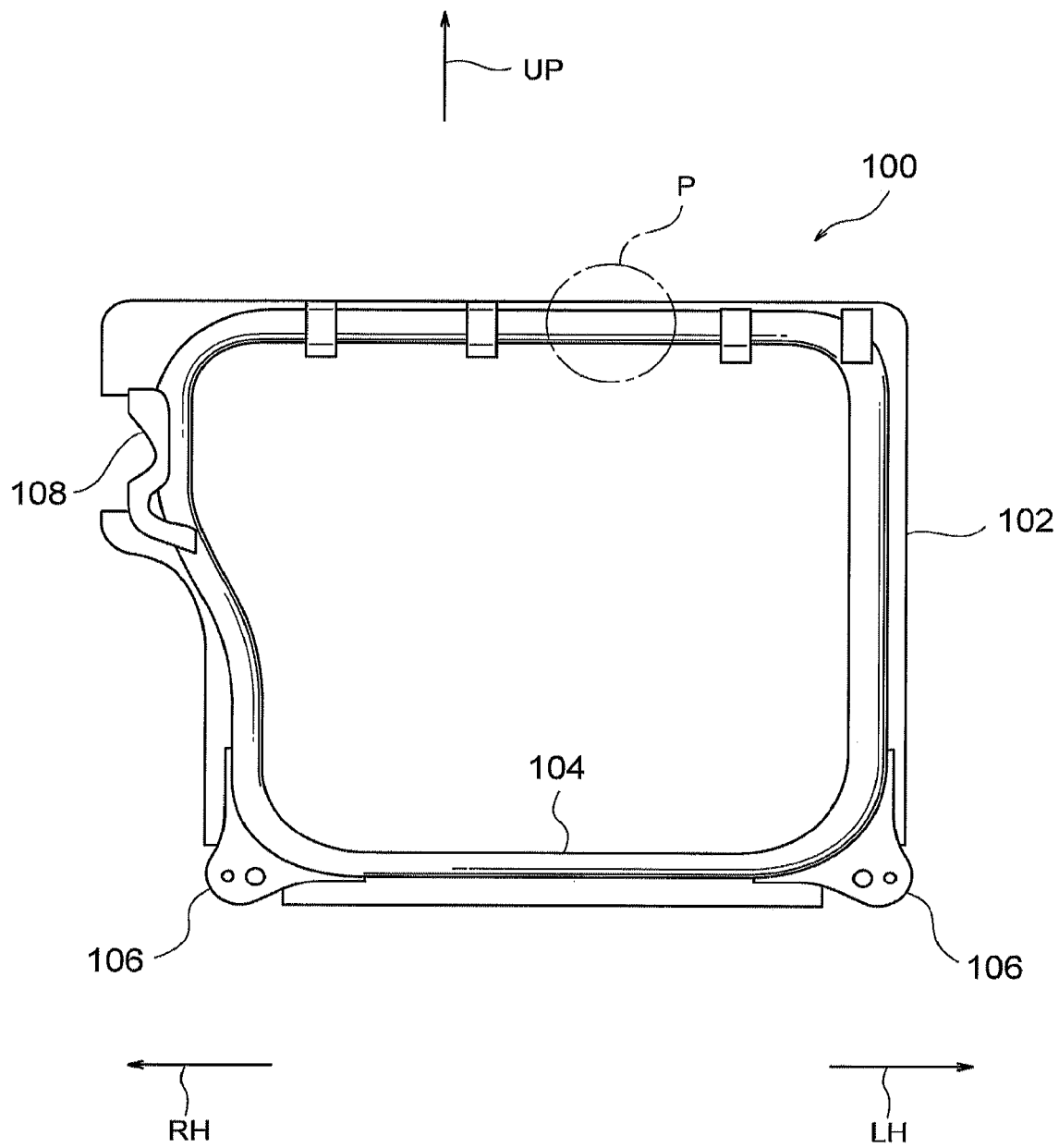
FIG. 7 is a front elevation diagram of a related art rear seatback frame.

Now, as illustrated in FIG. 7, in an ordinary related art rear seatback frame 100, a pipe frame 104 is welded to an outer periphery portion of a panel frame 102, which is a press-formed component. The pipe frame 104 is formed in a frame shape, of steel piping. Hinge brackets 106 for fixing respective turning hinges are welded to each of two width direction end portions of a lower end portion of the pipe frame 104. A lock setting bracket 108 for fixing a lock mechanism is mounted to one width direction end portion of an upper portion side of the pipe frame 104.

This pipe frame 104 does not linearly link between the hinge brackets 106, which are portions supported at the vehicle body, and a point of action of a load (see region P in FIG. 7) but links therebetween in roundabout manner. In other words, the pipe frame 104 reinforces unnecessary regions. Therefore, a usage amount of steel piping and a weight of the pipe frame is unnecessarily increased. In addition, when a load in the vehicle forward direction is borne via the seatbelt at the load action point (region P in FIG. 7), a torsional load acts on the pipe frame 104. Therefore, the pipe frame 104 requires stiffness with respect to torsional loads, and measures such as increasing the thickness of the pipe frame 104 and suchlike are necessary. As a result, this also increases the weight of the pipe frame 104. Therefore, the weight of the vehicle seat increases and consequently the weight of the vehicle increases.

This problem of the related art rear seatback frame 100 may be overcome with the rear seatback frame 18 of the vehicle rear seat 10 relating to the present exemplary embodiment as described above.

FIG. 8 illustrates, in a chart, results of strength tests on the rear seatback frame 18 relating to the present exemplary embodiment and the related art rear seatback frame 100, and a weight ratio between the two. As can be seen from FIG. 8, the rear seatback frame 18 relating to the present exemplary embodiment and the rear seatback frame 100 of the related art exhibit equivalent performances in strength tests, but the weight ratio is that the present rear seatback frame 18 is at least 30% lighter. Thus, in the vehicle rear seat 10 relating to the present exemplary embodiment, a framework with a high level of strength and a reduced weight may be realized.

In the vehicle rear seat 10, a load from the seatbelt 34 is inputted to the anchor wire 68 mounted at the first reinforcement portion 24A of the X-rib 24. Therefore, the load from the seatbelt 34 may be directly supported by the X-rib 24. Thus, stiffness of the rear seatback 14 with respect to loads from the seatbelt 34 may be even more excellently assured.

In the vehicle rear seat 10, the X-rib 24 is formed with a closed cross-section shape. Therefore, even if plate thickness dimensions of the open cross-section member 36, flat plate member 38 and the like constituting the X-rib 24 are reduced and the X-rib 24 is reduced in weight, stiffness of the X-rib 24 may be assured. Therefore, the overall structure of the present vehicle rear seat 10 may be further reduced in weight.

In the vehicle rear seat 10, the X-rib 24 with the closed cross-section shape is formed by the flat plate member 38 with the flat plate shape being joined to the open side of the open cross-section member 36 with the open cross-section shape. Thus, the X-rib 24 with the closed cross-section shape may be fabricated easily.

The X-rib 24 is further provided with the reinforcement plate 40 that spans between the floor wall portion 36A of the open cross-section member 36 and the flat plate member 38. Thus, stiffness of the X-rib 24 is improved by the reinforcement plate 40. Therefore, even if thickness dimensions of the open cross-section member 36 and the flat plate member 38 are reduced, stiffness of the X-rib 24 may be assured, and the X-rib 24 may be further reduced in weight. Hence, the present vehicle rear seat 10 may be further reduced in weight.

In the exemplary embodiment described above, the reinforcement plate 40 of the X-rib 24 has a structure that is provided with the long plates 42 and the short plates 44, but the present invention is not limited thus. The structures of the reinforcement plates may be suitably modified. For example, plural numbers of rectangular card-shaped reinforcement plates may be provided in rows with predetermined spacings in the length directions of the first reinforcement portion 24A and the second reinforcement portion 24B.

The exemplary embodiment described above has a structure in which the X-rib 24 is provided with the reinforcement plate 40, but the present invention is not limited thus. Structures from which the reinforcement plate 40 is omitted are possible.

The exemplary embodiment described above has a structure in which the X-rib 24 is formed by the open cross-section member 36 and the flat plate member 38 being joined to one another, but the present invention is not limited thus. A method of fabrication of the X-rib 24 may be suitably modified.

The exemplary embodiment described above has a structure in which the X-rib 24 is formed in a closed cross-section shape, but the present invention is not limited thus. The structure of the X-rib 24 may be suitably modified. For example, the flat plate member 38 may be omitted and the open cross-section member 36 directly joined to the panel frame 22.

The exemplary embodiment described above has a structure in which the anchor wire 68 is directly fixed to the first reinforcement portion 24A of the X-rib 24, but the present invention is not limited thus. The anchor wire 68 may be connected to the X-rib 24 via a bracket or the like.

The exemplary embodiment described above has a structure in which the anchor wire 68 and the belt retractor 30 are mounted at the rear seatback 14, but the present invention is not limited thus. The anchor wire 68 and/or the belt retractor 30 may be mounted at the vehicle body.

For the exemplary embodiment described above, a case is described in which the first reinforcement portion 24A and second reinforcement portion 24B of the X-rib 24 are formed integrally, but the present invention is not limited thus. The first reinforcement portion and the second reinforcement portion may be made separate and connected to one another.

For the exemplary embodiment described above, a case is described in which the rear seatback 14 is a seatback for seating two people that constitutes a tiltable rear seatback that is divided between left and right, but the present invention is not limited thus. It is sufficient that the seatback is configured such that two width direction end sides of a lower portion side and one width direction end side of an upper portion side of the seatback are supported at a vehicle body.

The exemplary embodiment described above has a structure in which the rear seatback 14 is supported at the vehicle body at only three points, the first supported portion 22A, the second supported portion 22B and the third supported portion 22C, but the present invention is not limited thus. That is, the present invention encompasses structures in which a seatback is supported at a vehicle body at four or more points but support strength is substantially assured by a first supported portion, second supported portion and third supported portion.

In the exemplary embodiment described above, a case is described in which the present invention is applied to the vehicle rear seat 10. However, the present invention is also applicable to vehicle front seats.

The invention claimed is:

1. A vehicle seat comprising:
    a panel frame that is formed in a panel shape and constitutes a framework of a seatback, and of which a first supported portion, a second supported portion and a third supported portion are supported at a vehicle body,
        the first supported portion being provided at one width direction end side of a lower portion side of the panel frame,
        the second supported portion being provided at the other width direction end side of the lower portion side, and
        the third supported portion being provided at one width direction end side of an upper portion side of the panel frame; and
    a reinforcement member that is formed in a closed cross-section shape and includes an open cross-section member with an open cross-section shape and a flat plate member with a flat plate shape, which is joined to an open side of the open cross-section member, a peripheral edge portion of the flat plate member protruding to an outer side of a peripheral edge portion of the open cross-section member in a flange shape and the protruding portion being welded to an open side end portion of the open cross-section member, the reinforcement member includes a first reinforcement portion and a second reinforcement portion and the reinforcement member is joined to the panel frame,
        the first reinforcement portion spanning between the first supported portion and a portion at the upper portion side of the panel frame at the width direction other end side relative to the third supported portion, and
        the second reinforcement portion being provided to intersect the first reinforcement portion and spanning between the second supported portion and the third supported portion,
        wherein the panel frame and the reinforcement member are discrete from each other, and the flat plate member of the reinforcement member is welded to the panel frame.

2. The vehicle seat according to claim 1, wherein each of the first reinforcement portion and the second reinforcement portion is formed to be linear.

3. The vehicle seat according to claim 1, wherein a seatbelt support portion that supports a seatbelt applied to a seat occupant is provided at the width direction other end side of the upper portion side of the panel frame relative to the third supported portion.

4. The vehicle seat according to claim 3, wherein the seatbelt support portion is provided at the first reinforcement portion.

5. The vehicle seat according to claim 1, wherein the reinforcement member further comprises a reinforcement plate that spans between a floor wall portion of the open cross-section member and the flat plate member and that is joined to both of the open cross-section member and the flat plate member.

6. The vehicle seat according to claim 1, wherein the reinforcement member is provided with the first reinforcement portion and the second reinforcement portion integrally.

7. The vehicle seat according to claim 4, wherein a seatbelt support portion setting portion is provided at the first reinforcement portion, the seatbelt support portion setting portion being formed in a long strip shape along the width direction of the panel frame, and the seatbelt support portion is mounted at a seatbelt support portion setting portion.

8. The vehicle seat according to claim 7, wherein the seatbelt support portion setting portion is formed to be longer than the seatbelt support portion.

9. The vehicle seat according to claim 1, wherein
    a lock setting portion is provided at the second reinforcement portion, the lock setting portion being formed in a long strip shape along an up-down direction of the panel frame, and
    a lock mechanism is mounted at the lock setting portion, the lock mechanism catching on a striker that is mounted at a vehicle body side portion.

10. The vehicle seat according to claim 9, wherein the lock setting portion is formed to be longer than the lock mechanism.

11. The vehicle seat according to claim 1, wherein hinge arms are fastened to the first reinforcement portion and the second reinforcement portion, the hinge arms being hinge-joined to hinge bases that are fixed to the vehicle body.

12. The vehicle seat according to claim 3, wherein a belt retractor that winds up the seatbelt is mounted at the panel frame, and the seatbelt support portion is provided at the upper side of the panel frame relative to the belt retractor.

13. The vehicle seat according to claim 5, wherein the reinforcement plate is formed by two long plates being combined into an X shape, the first reinforcement portion being reinforced by one of the long plates, and the second reinforcement portion being reinforced by the other of the long plates.

14. The vehicle seat according to claim 5, wherein pluralities of the reinforcement plate are provided in rows with predetermined spacings in the length directions of the first reinforcement portion and the second reinforcement portion.

15. The vehicle seat according to claim 1, wherein the open cross-section member and the flat plate member are formed in X shapes.

16. The vehicle seat according to claim 4, wherein the seatbelt support portion is attached to the first reinforcement portion.

17. The vehicle seat according to claim 5, wherein the reinforcement plate is discrete from the panel frame.

* * * * *